C. W. McKIBBEN.
APPARATUS FOR TREATMENT OF OIL EMULSIONS.
APPLICATION FILED DEC. 18, 1918.
1,327,835.
Patented Jan. 13, 1920.
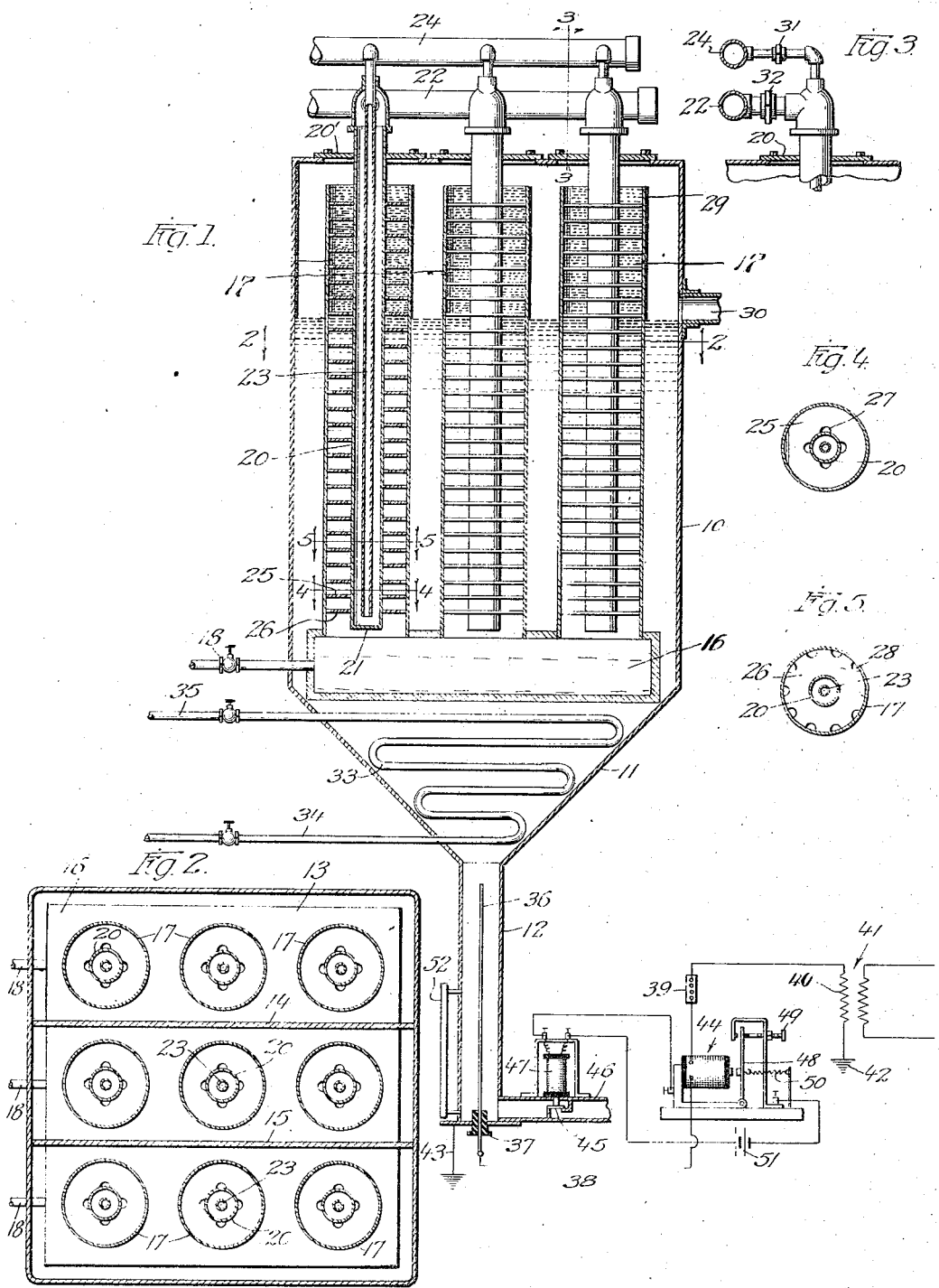

UNITED STATES PATENT OFFICE.

CHARLES W. McKIBBEN, OF HOUSTON, TEXAS.

APPARATUS FOR TREATMENT OF OIL EMULSIONS.

1,327,835.  Specification of Letters Patent.  Patented Jan. 13, 1920.

Application filed December 18, 1918. Serial No. 267,287.

*To all whom it may concern:*

Be it known that I, CHARLES W. McKIBBEN, a citizen of the United States, residing at Houston, in the county of Harris and State of Texas, have invented certain new and useful Improvements in Apparatus for Treatment of Oil Emulsions, of which the following is a specification.

My invention relates to apparatus for treatment of oil emulsions, and the like.

One of the objects of my invention is to provide a means that will greatly assist in the separation of water from oil emulsions and which will aid in the re-absorption or retention of gas, in the nascent state, about to be liberated by the oil, or which has been released, so that the gas may be retained in the oil and contribute to enhancing the value of the oil in the manufacture of gasolene therefrom.

Other and further objects of my invention will become readily apparent to persons skilled in the art, from a consideration of the following description when taken in conjunction with the drawings, wherein:—

Figure 1 is a vertical elevation in section, of the device.

Fig. 2 is a transverse section taken on line 2—2 of Fig. 1.

Fig. 3 is a section taken on line 3—3 of Fig. 1.

Fig. 4 is a section taken on line 4—4 of Fig. 1.

Fig. 5 is a section taken on line 5—5 of Fig. 1.

In all the views the same reference characters are employed to indicate similar parts.

10 is a tank to contain oil, having a hopper bottom 11 and a cylindrical settling chamber 12.

Contained in the upper part of the tank, above the hopper part, are three units, 13, 14 and 15, each comprising a header 16 and a series of relatively large vertical pipes 17 connected at the bottom ends to the header and open at the upper ends. Each of the headers 16 has an oil entrance pipe 18. Inside of each of the pipes 17 is a steam pipe 20, closed at its lower end, as at 21, and connected at its upper end to a steam inlet header 22. A smaller steam return pipe 23, open at its lower end, is connected to the exhaust header 24.

On the outer pipe 20, are alternately spaced apart disks 25 and 26. The disks 25 have notches, or openings 27, near the pipe 20 and the disks 26 have notches 28 near their periphery or adjacent the pipe 17, so that the oil in its journey upward from the headers 13, 14 and 15 must pass in a tortuous path between these disks and into contact with the outer pipe 20, which is heated by steam. By this means the period of time that the oil will pass from the header 15 to the upper part or discharge end 29 of the pipes 17 is very much prolonged and at the same time the oil or other fluid is brought forcibly into contact with the pipe 20 that is heated by steam. This long association of the oil or emulsion with the gas about to be liberated or with the gas that has already been liberated, has a tendency to cause the oil to retain the gas instead of liberating it as it would if it were in an open tank, and furthermore it gives time for the water to be precipitated from the oil after the emulsion has been properly treated in a system in which the oil globules are electrically polarized and ruptured. When the oil enters the headers 16 of the units 13, 14 and 15, as the case may be, through the pipes 18, it finds its way upward through the ramifications between the disks and finally discharges at the upper end 29 of the pipe 17, and from the tank it is delivered by a pipe 30.

There is more or less sediment or sludge in the oil which will settle upon the disks and therefore it sometimes becomes necessary to lift the disks and the steam pipes bodily from the pipe 17. To facilitate such operation I have provided the unions 31 and 32, so that the pipes 20 and 23, with the associated disks 25 and 26 may be bodily lifted from the pipes 17, as an assembled unit and cleaned and replaced.

A steam coil 33, having an entrance pipe 34 and a discharge pipe 35 may be placed in the hopper part 11 of the oil receiver to maintain the emulsion at proper temperature and thereby further hasten the separation of the water from the oil.

A preferably cylindrical settling chamber 12 is provided at the bottom of the hopper 11, into which the water will finally gravitate or settle. An electric conductor or rod 36 is placed centrally of the chamber 12 and is insulated therein by a plug 37. The lower end of the rod 36 is connected by a wire 38 to a resistance 39 and from that to a secondary 40 of a transformer 41, and thence to the ground, as at 42. The chamber 12 is connected to the ground by a wire 43. A relay 44 is placed in this circuit with the resistance 39 and the rod 36 and while I have shown a transformer 41 for furnishing electric current a direct current source of electric energy may be used as well, and in some instances to a better effect.

A valve 45 is located in the discharge pipe 46 through which water may be discharged from the settling chamber 12. The valve is normally closed but is opened by the electro-magnet 47 which is controlled by the relay 44. The water that was associated with the oils is usually of a salt character and of relatively low resistance and therefore when the freed water settles in the chamber 12 and displaces the emulsion, the resistance between the interior of the pipe 12, constituting the chamber, and the rod 36 becomes greatly reduced, thereby causing the relay to attract its tongue 48 and close the local circuit, energizing the electro-magnet 47 and opening the valve. So soon as oil or emulsion from the hopper 11 settles into the chamber 12, to take the place of the water discharged therefrom, the resistance will be thereby increased so that the tongue 48 will be drawn back against the back contact 49 by the spring 50, thereby opening the local circuit and permitting the valve to close. The battery 51 energizes the electro-magnet 47 in a suitable circuit connected to the relay.

52 is a water glass to indicate visually the amount of water in the chamber 12. This automatic water discharging apparatus is fully described and claimed in my United States Letters Patent No. 1,276,386 dated August 20, 1918, and therefore further description here is unnecessary.

While I have herein shown a single embodiment of my invention for the purpose of clear disclosure it is manifest that changes may be made in configuration and arrangement of the parts within the spirit and scope of the appended claims.

Having described my invention, what I claim is:—

1. In a device of the character described, a vertically disposed pipe; a steam pipe therein closed at its bottom end; a smaller steam pipe in the first mentioned steam pipe, open at its bottom end and a series of disks spaced apart longitudinally on the larger steam pipe and neatly fitting the vertical pipe, adjacent disks having openings near the axis of one and near the periphery of the other, to provide a tortuous path for a liquid traversing the pipe; and means to admit liquid between the larger steam pipe and the vertical pipe.

2. A device of the character described comprising a tank; two concentric vertically disposed pipes in the tank; a series of spaced apart disks between the pipes, alternate disks having openings near their axes and the intermediate disks having openings near their peripheries to provide a tortuous path for an emulsion through the outer vertical pipe to precipitate the water; and a connection between the inner pipe and a suitable source of heat to raise the temperature of the liquid while passing through the outer pipe.

3. A device of the character described comprising a tank having a hopper-shaped part at its lower end and a cylindrical, elongated settling chamber, communicating with the small bottom end of the hopper; a header in the tank above the hopper; a series of pipes connected to the header and open at their top ends near the upper part of the tank; a steam inlet and exhaust pipe concentrically arranged in each of the vertical pipes and spaced apart disks between the larger steam pipe and the vertical pipe to provide a tortuous path for the liquid from one end of the vertical pipe to the other.

In testimony whereof I hereunto subscribe my name.

CHARLES W. McKIBBEN.